Dec. 3, 1968 W. GROBE 3,414,680

ELECTRONICALLY CONTROLLED CROSSBAR SWITCHING NETWORK

Filed July 30, 1965 4 Sheets-Sheet 1

Dec. 3, 1968 W. GROBE 3,414,680

ELECTRONICALLY CONTROLLED CROSSBAR SWITCHING NETWORK

Filed July 30, 1965 4 Sheets-Sheet 2

Dec. 3, 1968 W. GROBE 3,414,680

ELECTRONICALLY CONTROLLED CROSSBAR SWITCHING NETWORK

Filed July 30, 1965 4 Sheets-Sheet 3

Dec. 3, 1968 W. GROBE 3,414,680

ELECTRONICALLY CONTROLLED CROSSBAR SWITCHING NETWORK

Filed July 30, 1965 4 Sheets-Sheet 4

United States Patent Office 3,414,680
Patented Dec. 3, 1968

3,414,680
ELECTRONICALLY CONTROLLED CROSSBAR SWITCHING NETWORK
Wolfgang Grobe, Ludwigsburg, Germany, assignor to International Standard Electric Corporation, New York, N.Y., a corporation of Delaware
Filed July 30, 1965, Ser. No. 476,064
Claims priority, application Germany, Aug. 5, 1964, St 22,503
7 Claims. (Cl. 179—18)

ABSTRACT OF THE DISCLOSURE

A plurality of crossbar switches have electronic switches at each of their inputs and outputs, a vertical and a horizontal multiple being coupled to a common electronic switch. A selection of an input and an output switch selects a crosspoint in each crossbar switch. A selection of a common switch localizes the connection to a single crosspoint in a single crossbar switch.

Figure 1:
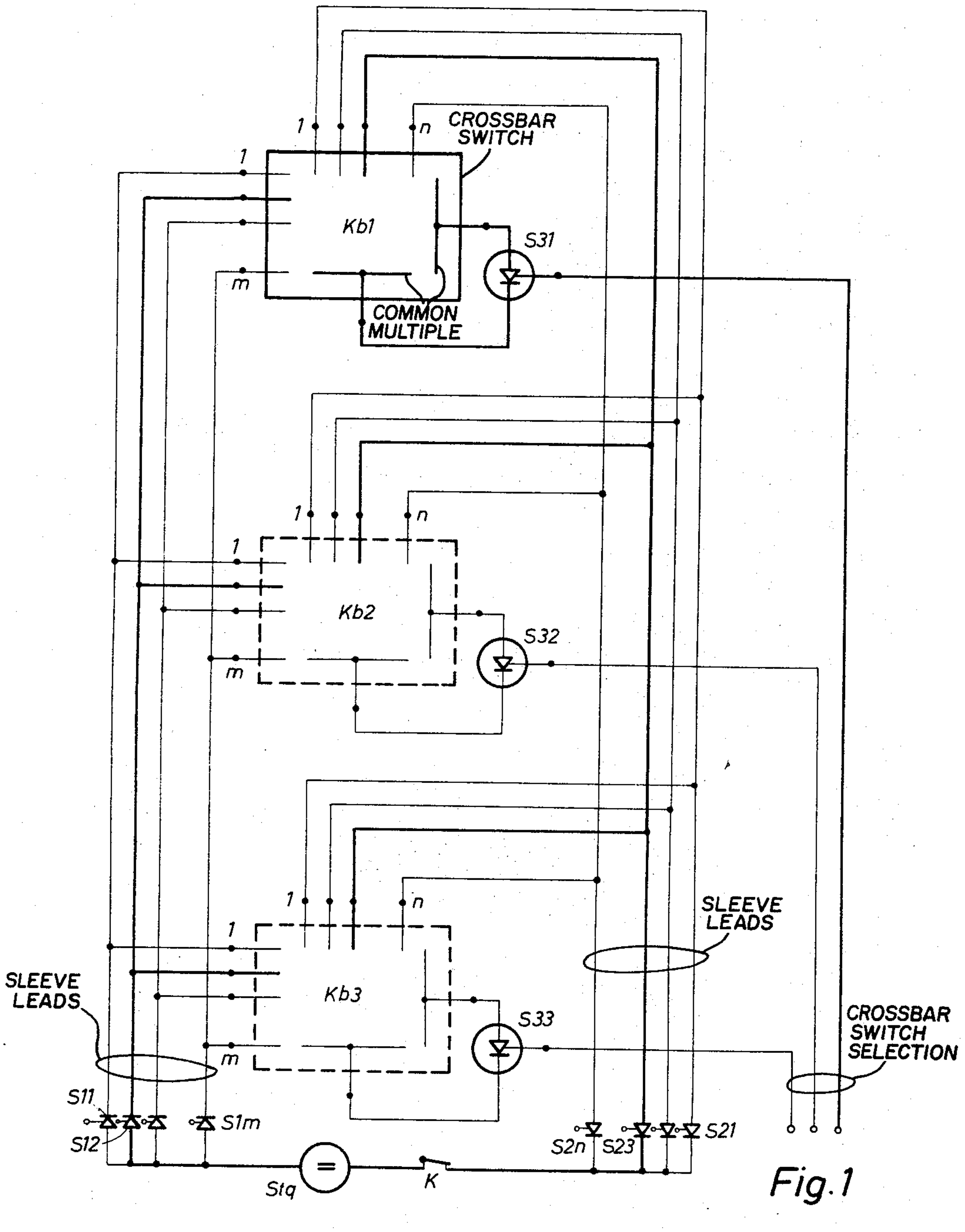

The invention relates to an arrangement for controlling switching stages having several switch blocks, and more particularly to telephone exchange systems, equipped with crossbar switches.

Telephone exchange systems sometimes operate with electronically controlled crossbar switches. The problem here is that the mechanical switching elements have relatively long responding periods, while the electronics produce relative short control pulses. It would be very uneconomical to reduce the speed of the central electronic control facility, because less call connections per defined time could be established.

In order to eliminate this mechanical-electronic compatibility difficulty, known systems use storage-type switches. These switches respond to a short control pulse and then remain in an operated condition for some time after the end of the control pulse.

In a known arrangement, storage facilities are provided in each input line of a switch block, which temporarily store the switch control signals.

The storage-type switches could be any known devices, as for example flip flops, thyratrons, controlled rectifiers, or trigger tubes. But these are relatively expensive devices. If a storage switch is necessary for each crosspoint of each switch block, the overall costs of such a system becomes very high.

According to the invention, the number of required storage switches is reduced to a minimum.

More particularly, telephone exchange systems are equipped with crossbar switches. In this type of a system, connection and disconnection of a crosspoint depends on (1) the selection of a storage switch associated in common with all equal rows of the switch blocks, (2) on the selection of a storage switch associated in common with all columns of the switch blocks, and (3) on the selection of one or a combination of storage switches, associated in common with all rows and/or columns of a switch block.

The limit number of $p$ switch blocks is an economic one. It pays to use a combination of storage switches for marking a switch block, if the ratio of the costs of a decoupling diode is favorable as compared to the costs of a controlled rectifier. It can be, for example, within the ratio range of 4 . . . 9, but these figures are not critical.

In systems known to the art, only one through-connection can be made in one switching stage at one time. Thus it is entirely sufficient if only one marking of a crosspoint can be carried out with the storage switches at one time.

If in one switching stage, not more than $p$ parallel switched blocks exist, the circuit arrangement with the minimum cost is characterized in this that (1) all equal row inputs (e.g. all second row inputs) of the switch blocks are connected one pole of a voltage source via a storage switch of a first group of storage switches, (2) all equal column outputs (e.g. all third column outputs) of the switch blocks are connected to the other pole of the voltage source via a storage switch of a second group of storage switches and via a break-contact, and (3) all row outputs and column inputs of a switch block are connected through a storage switch of a third group of storage switches, especially associated with each switch block.

If more than $p$ parallel switch blocks exist in one switching stage the circuit arrangement with the minimum expenditure is characterized in this that (1) all equal row inputs (e.g. all third row inputs) of the switch blocks are connected to one pole of the current source via a storage switch of a first group of storage switches, that (2) all equal column outputs (e.g. all second column outputs) of the switch blocks are connected to the other pole of the current source via a storage switch of a second group of storage switches and a break-contact, and that (3) the column inputs and row outputs, common to a switch block, are connected (a) via a third group of storage switches distributed over the column inputs, and (b) via a fourth group of storage switches distributed over the row outputs. By actuating one storage switch in each of the four groups of storage switches, a defined cross-point in a defined switch block is connected or disconnected, respectively, depending on the excitation of a pole-reversing row.

The break-contact in front of the current source opens for a moment, in order to end the current flowing through the storage switch.

Figure 2:
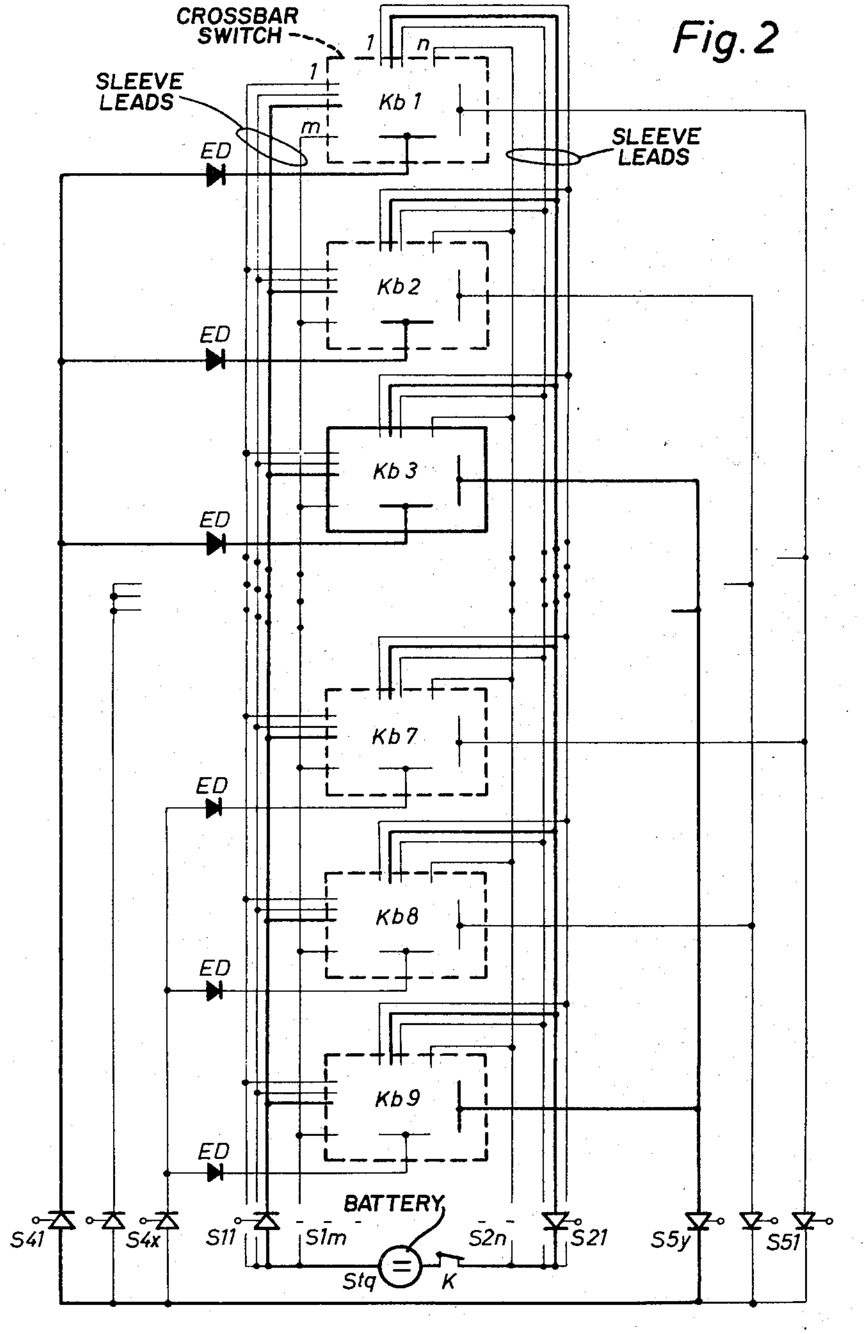
Figure 3:
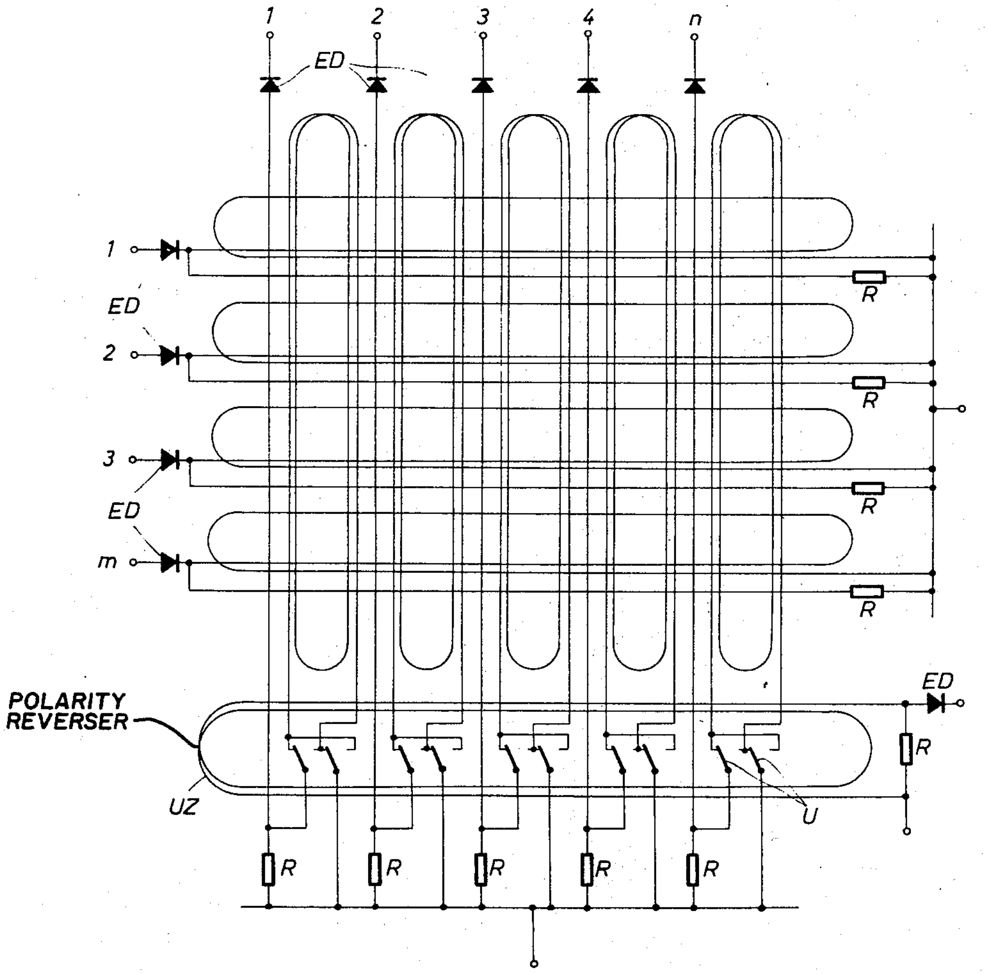
Figure 4:
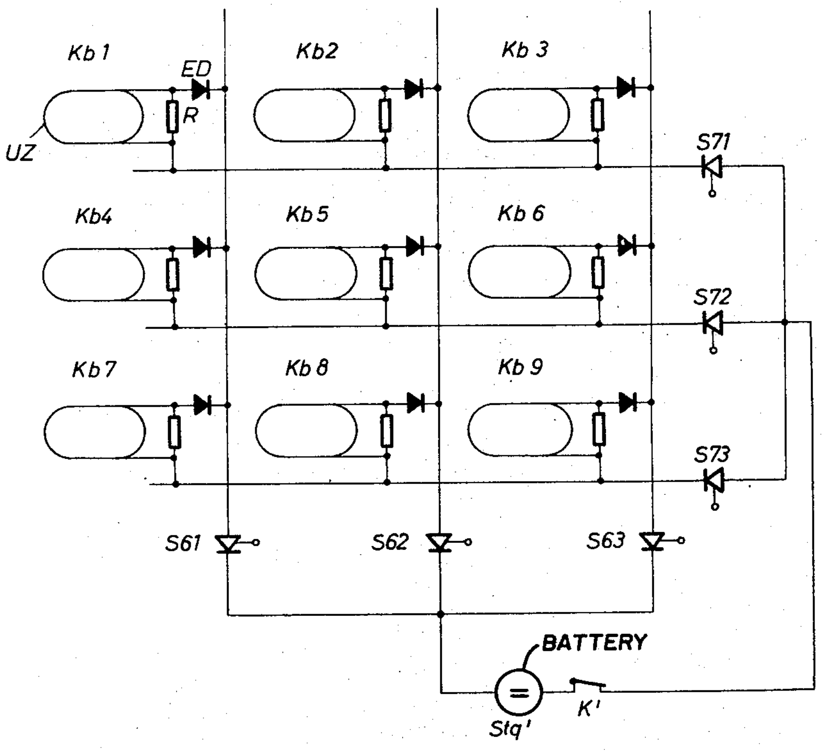

The circuit arrangements to carry out the invention are now explained in detail with the aid of the accompanying drawings, wherein:

FIG. 1 shows a circuit arrangement for a switching stage with 3 ($3<p$) parallel switch blocks, FIG. 2 shows a circuit arrangement for a switching stage with more than $p$ parallel switch blocks, FIG. 3 shows the circuitry of a switch block with the pole-reversing row for the column coils, and FIG. 4 shows the crossbar-type operation of the pole-reversing rows of several switch blocks.

The circuit arrangement (according to FIG. 1) contains the parallel switch blocks K$b$1, K$b$2, and K$b$3. The current flows through three groups of storage switches S11 to S1*m*, S21 to S2*n*, and S31 to S33. These may be silicon controlled rectifiers, for example. All switch blocks have $m$ row inputs. The equivalent row inputs are connected in parallel with a storage switch of the first group S11 to S1*m*. For example, all inputs marked 1 are connected to storage switch S11. All switch blocks are also equipped with $n$ column outputs. Again the equivalent column outputs are connected in parallel with a storage switch of the second storage switch group S21 to S2*n*. In each switch block the common row output is connected with the common column input via a storage switch of the third group S31 to S33.

In the example shown, current flows when the storage switches S12, S23, and S31 are operated. This flow is from the current source S*tq* via the storage switch S12, the second line input of the first switch block, the common line output, the storage switch S31, the common column input, the third column output, the storage switch S23, and break-contact K to the current source. This current is marking the crosspoint between the second row and the third column in the first switch block.

An internal circuit of a switch block, is represented separately in FIG. 3. For the storage switches the symbol of a controlled rectifier is shown, but it might also be any other suitable types of storage devices.

FIG. 2 shows a circuit arrangement according to the invention. The switching stage has nine matrices or switch blocks K*b*1 to K*b*9. Each switch block again has *m* row inputs and *n* column output. A common output serves all rows and another common input serves all columns. The *m* line inputs and the *n* column outputs are connected as shown in FIG. 1. A current source S*tq* is coupled via two groups of storage switches S11 to S1*m* and S21 to S2*n*. In order to gain a clear view, only one storage switch is symbolically shown on the drawing for each of the two groups. Nevertheless, it should be understood that there is a switch for each input or output.

For further reduction of the number of the required storage switches, the third group of storage switches according to FIG. 1 is divided into two groups of storage switches S41 to S4*x* and S51 to S5*y*, aligned with the switch blocks K*b*1 to K*b* in the coordinate type. Through decoupling diodes ED the storage switch S41 (is for example) connected with the common column inputs of the switch blocks K*b*1, K*b*2, and K*b*3. The storage switch S4*x* is connected with the column inputs of the switch blocks K*b*7, K*b*8, and K*b*9. The other end of the storage switches S41 to S4*x* leads to the succeeding group of storage switches S51 to S5*y*. For example, the row outputs of the switch blocks K*b*1. K*b*4 (not shown on the drawing) and K*b*7 are connected with storage switch S51. The storage switch S5*y* is connected with the common row outputs of the switch blocks K*b*3, K*b*6 (not shown on the drawing), and K*b*9.

In this example current flows, when actuating the storage switches S13, S22, S41, and S5*y*, from the current source S*tq* through the storage switch S13, via the third row input of the switch block K*b*3, the common row output, the storage switches S5*y* and S41, through the common column input of the switch block K*b*3, via the second column output, the storage switch S22 and via the break-contact K back to the current source. Thus, the crosspoint between the third row and the second column in switch block K*b*3 is excited. Still further currents flow, as through the third row in the switch block K*b*9, for example, but here thereis no coincidence with a current flowing through a column.

FIG. 3 shows an example of an internal circuitry of a switch block. The switch block has *m* row inputs, a common row output, a common column input and *n* column outputs. The row inputs and column outputs are connected via decoupling diodes ED. The resistors R are in parallel with the row- and column-coils. In the current path of each column coil, a pole-reverser U is provided. When the pole-reversing row UZ is energized, the direction of current flow is reversed. A crosspoint elemen at the intersection of a selected row and a selected column is operated at the position of the pole-reverser, shown on the drawing, and a connection is established. In the opposite position of the pole-reverser, the selected crosspoint element is released, and the connection is interrupted.

FIG. 4 shows a coordinate-type actuation of the pole-reversing rows of the switch blocks. The example selected here represents a switching stage with nine switch blocks K*b*1 to K*b*9. This type of actuation here too saves a storage switch. Each pole-reversing row is inserted between a column- and row-lead via a decoupling diode ED and in parallel to a resistor R. The column leads are connected with one terminal of a current sources S*tq'* via three storage switches S61, S62, and S63, the row-leads are connected with the other pole of the current source via three storage switches S71, S72, and S73 and via the break-contact K'. By always actuating one storage switch in both groups, a defined pole-reversing row is under current. The current ceases only then, when the break-contact K' opens.

While I have described the above principles of my invention in connection with specific apparatus, it is to be clearly understood that this description is made only by way of example and not as a limitation on the scope of my invention.

I claim:

1. A switching network comprising a plurality of crossbar switches connected in switching blocks,
   an electronic switch means individually associated with each corresponding horizontal multiple inlet and each corresponding vertical multiple outlet of all of said crossbar switches,
   a common horizontal and vertical on each of said crossbar switches interconnected by an electronic switch,
   means for selecting a cross point in each of said crossbar switches by selectively firing one of said electronic switch means at said inlets and outlets of said crossbar switches, and
   means for selecting one of said crossbar switches by selectively firing the common electronic switch associated therewith.

2. The network of claim 1, and a source of current having two poles,
   said electronic switches being polarized so that current flows from one of said poles through a selected one of said individual electronic switches,
   a common multiple in one of said orthogonal directions,
   a selected common electronic switch, and the common multiple in the other orthogonal direction and another selected one of said individual switches to the other of said poles,
   a crosspoint being selected at the intersection of said two multiples.

3. The network of claim 1 and contact means between said other electronic switch and said other pole, and
   means responsive to an opening at said contact means for releasing said selected crosspoint.

4. The network of claim 1 wherein there are a plurality of crossbar switches,
   the common electronic switches being connected between the common horizontals in each of a first group of crossbar switches and the common verticals in each of a second group of crossbar switches,
   each common electronic switch appearing in coincidence at the horizontal and vertical common multiples of one switch in any single group of crossbar switches, thereby enabling a selection of the crossbar switch where there is such a coincidence.

5. The network of claim 1 wherein said crosspoints are bistable magnetic devices, and
   means for reversing the direction of current flow to said bistable devices in order to operate or release said crosspoints.

6. A circuit arrangement according to claim 5 characterized in this that the switch blocks comprise a grid of coordinate-type coils with decoupling rectifiers,
   that as crosspoint elements mechanically neutral, magnetically bistable and not neutral relays are used, and
   that for each switch block a pole reversing row is provided, which, being actuated in the coordinate-type,
   the bistable magnetic crosspoint element of a crosspoint in a switch block is either energized or released.

7. A circuit arrangement according to claim 5, characterized in this that also bistable electronic elements are provided as crosspoint elements for through-connecting the speech paths, which trigger from the resting into the operative condition due to the coincidence of the magnetic fields of row- and column-coil and which are restored to resting position when the current, led through them, is interrupted.

References Cited

UNITED STATES PATENTS 3,311,708 3/1967 DeKroes ---------- 179—18.7

KATHLEEN H. CLAFFY, *Primary Examiner.*

L. A. WRIGHT, *Assistant Examiner.*